(12) United States Patent
Shimada et al.

(10) Patent No.: US 10,865,844 B2
(45) Date of Patent: Dec. 15, 2020

(54) FRICTION MATERIAL

(71) Applicant: NISSHINBO BRAKE, INC., Tokyo (JP)

(72) Inventors: Wataru Shimada, Gunma-Ken (JP); Yuji Yadomaru, Gunma-Ken (JP); Tsuyoshi Kondo, Gunma-Ken (JP)

( * ) Notice: Subject to any disclaimer, the term of this patent is extended or adjusted under 35 U.S.C. 154(b) by 39 days.

(21) Appl. No.: 15/533,993

(22) PCT Filed: Nov. 17, 2015

(86) PCT No.: PCT/JP2015/082293
§ 371 (c)(1),
(2) Date: Jun. 7, 2017

(87) PCT Pub. No.: WO2016/093027
PCT Pub. Date: Jun. 16, 2016

(65) Prior Publication Data
US 2018/0313420 A1 Nov. 1, 2018

(30) Foreign Application Priority Data

Dec. 12, 2014 (JP) .................. 2014-251547

(51) Int. Cl.
*F16D 69/02* (2006.01)
*C08K 5/315* (2006.01)
*C08G 59/08* (2006.01)

(52) U.S. Cl.
CPC ........... *F16D 69/026* (2013.01); *C08G 59/08* (2013.01); *C08K 5/315* (2013.01); *F16D 69/025* (2013.01); *F16D 2200/0069* (2013.01)

(58) Field of Classification Search
CPC .............................. F16D 69/025; F16D 69/026
See application file for complete search history.

(56) References Cited

U.S. PATENT DOCUMENTS

| 4,748,193 A * | 5/1988 | Hays, Jr. ............... C08K 3/08 523/155 |
| 6,794,078 B1 * | 9/2004 | Tashiro ............... H01M 8/0226 29/623.1 |
| 2004/0175544 A1 | 9/2004 | Saikatsu et al. |
| 2013/0220746 A1 * | 8/2013 | Unno .................... F16D 69/026 188/251 A |

FOREIGN PATENT DOCUMENTS

| CN | 1431408 A | 7/2003 |
| CN | 101341293 A | 1/2009 |
| CN | 102235453 A | 11/2011 |
| CN | 103429695 A | 12/2013 |
| EP | 0423057 | 4/1991 |
| JP | 1991-239784 | 10/1991 |
| JP | 1997-71768 | 3/1997 |

* cited by examiner

*Primary Examiner* — Vickey Nerangis
(74) *Attorney, Agent, or Firm* — Apex Juris PLLC; Tracy M Heims

(57) ABSTRACT

To provide a friction material used for a brake shoe of a drum brake for a passenger car, which continuously reduces generation of low frequency noise and provides excellent braking effectiveness and wear resistance and is manufactured by forming a friction material composition which contains no cleavage substance, 8-12 weight % of a phenolic thermosetting resin as the binder, 9-18 weight % of cashew dust as the organic friction modifier, 6-12 weight % of a rubber particle, where the total amount of the cashew dust and rubber particle is 18-25 weight %, and 4-10 weight % of the aluminum particle as the inorganic friction modifier, all relative to the total amount of the friction material composition. The friction material contains the phenolic thermosetting resin consists of a straight novolak phenolic resin and the unvulcanized nitrile rubber (NBR) particle.

4 Claims, No Drawings

FRICTION MATERIAL

FIELD OF THE INVENTION

This invention relates to a friction material used for a brake shoe of a drum brake utilizing for a passenger car, which is manufactured by forming a friction material composition.

BACKGROUND OF THE INVENTION

Conventionally, a drum brake is used as a brake device for an automotive, and a brake shoe formed by affixing a friction material on a metal base member such as a steel base member is used as a friction member as a part of the drum brake.

The friction material used for the brake shoe of the drum brake is generally called a brake lining, which is manufactured by forming the friction material composition made from the predetermined amount of materials such as a fiber base, a binder, a lubricant, an inorganic friction modifier, an organic friction modifier, a pH adjuster, and a filler.

Recently, a braking system in excellent silence property is in great demand, and there is a growing demand for reducing an occurrence of a low frequency noise so-called "groan" as well as high frequency noise generated during braking.

The low frequency noise is generated when a component of the friction material transfers to attach on a friction surface of a mating member as a result of the braking action repetition, thereby forming a film layer thereon, and stick slip occurs between the film layer and the friction material, thereby generating a noise around 100-1000 Hz.

Accordingly, the friction material composition has been improved in order to provide the friction material that reduces the occurrence of the low frequency noise.

The Patent Document 1 discloses the friction material composition that contains the metal fiber, the organic fiber, the inorganic fiber, and the binder, which includes 2-10 weight % of graphite relative to the entire composition and 1-25 weight % of the mineral in the plate like structure that could easily be cleaved between the layers and discloses the friction material characterized to be formed by mixing the obtained friction material composition, heat press forming the mixed friction material composition, and baking the heat press formed friction material composition.

According to the Patent Document 1, the low frequency noise can be inhibited when the predetermined amount of the graphite and the mineral in the plate like structure that could easily be cleaved between the layers such as mica and vermiculite are added to the friction material composition.

The Patent Document 2 discloses the friction material that is characterized in that the friction material contains the fiber base, the resin binder, mica and other fillers and that the above-mentioned mica is made from synthetic fluorine mica.

According to the Patent Document 2, the adhesion between the friction material and the mating member that is the cause of occurrence of the stick slip is inhibited and avoided by cleaving the mica, which is filled in the friction material, in the flake like shape and peeling the same to form a lubrication surface. As a result of this process, the low frequency noise can be reduced.

In order to inhibit the low frequency noise, it is a matter of common knowledge to a person skilled in the art to add cleavable substances such as graphite, mica, and vermiculate to the friction material composition described above.

However, the effectiveness of adding the cleavable substances is significant in the friction material used for the disc brake pad for the disc brake, and no significant effectiveness can be seen when the cleavable substances are added in the friction material used for the brake shoe of the drum brake. Ironically, an addition of the cleavable substances in the friction material used for brake shoe of the drum brake tends to generate the low frequency noise.

This discrepancy arises due to the difference in the operating environments between the friction material used in the disc brake pad for the disc brake and the friction material used in the brake shoe of the drum brake.

The disc brake is mainly employed in the brake device for a front wheel for the passenger car, and the friction material used in the disc brake pad is frequently used under a high temperature/high load environment. Therefore, the friction material is prone to be worn, so that the friction surface of the friction material is always in a new condition. As a result, the effectiveness of the cleavable substance can continuously be obtained, and the effectiveness for inhibiting the low frequency noise can be maintained.

On the other hand, the drum brake is mainly employed in the brake device for a rear wheel for the passenger car, and the load on the friction material used in the brake shoe is relatively small, so that the friction material wear does not progresses easily. While the friction surface of the friction device is a relatively new condition, because of the existence of the cleavable substance on the friction surface, effective inhibition of the low frequency noise can be expected; however, if the cleavable substance disappears from the friction surface of the friction device and also the condition that the friction material wear is not being progressed is maintained, the effective inhibition of the low frequency noise due to the cleavable substance cannot be obtained.

Furthermore, if the drum brake is used in the condition that the cleavable substance disappears from the friction surface of the friction material and a strong shearing force is applied to the friction material, slippage occurs between the layers of the cleavable substance existing inside the friction material, thereby tending to cause stick slip effect. As a result, the low frequency noise tends to occur.

PRIOR ART

Patent Document

[Patent Document 1] Japanese Provisional Patent Publication 1991-239784
[Patent Document 2] Japanese Provisional Patent Publication 1997-71768

SUMMARY OF THE INVENTION

Problems to be Resolved by the Invention

In relation to a friction material used for the brake shoe of the drum brake utilizing for the passenger car, which is manufactured by forming the friction material composition containing the binder, the fiber base (organic fiber), the inorganic friction modifier, the organic modifier, the pH adjuster, and the inorganic filler, it is an object of this invention to provide the friction material continuously reduces the occurrence of the low frequency noise and the excellent braking effectiveness and wear resistance.

Means to Resolve the Problems

In the above-structure, the inventors of this invention surprisingly found that in the friction material used for the brake shoe of the drum brake utilizing for the passenger car, which is manufactured by forming the friction material composition containing the binder, the organic fiber, the inorganic friction modifier, the organic friction modifier, the pH adjuster, and the inorganic filler, in order to continuously inhibit the low frequency noise, the cleavable substances such as graphite, mica, and vermiculite that were conventionally believed to be effective in inhibiting the low frequency noise should be omitted from the friction material composition to achieve the best result. Furthermore, the inventors of this invention accomplished this invention as finding that the inventor could provide the friction material composition having a good braking effectiveness while repressing the occurrence of the low frequency noise by using the friction material composition that contains the specific amount of phenolic thermosetting resin as the binder, the specific amount of the cashew dust and the rubber particles as the organic friction modifier, and the specific amount of the aluminum particles as one part of the inorganic friction modifier.

This invention relates to the friction material used for the brake shoe of the drum brake utilizing for the passenger car, which is manufactured by forming the friction material composition and has the following technical features.

(1) The friction material used for the brake shoe of the drum brake for the passenger car, which is manufactured by forming the friction material composition containing the binder, the organic fiber, the inorganic friction modifier, the organic friction modifier, the pH adjuster, and the inorganic filler, where the friction material composition does not contain the cleavage substance and contains 8-12 weight %, relative to the total amount of the friction material composition, of the phenolic thermosetting resin as the binder, 9-18 weight %, relative to the total amount of the friction material composition, of cashew dust as the organic friction modifier and 6-12 weight %, relative to the total friction material composition, of the rubber particle as the organic friction modifier, where the total amount of the cashew dust and rubber particle is 18-25 weight % relative to the total amount of the friction material composition, and 4-10 weight %, relative to the total amount of the friction material composition, metallic aluminum particle as the inorganic friction modifier.

The friction material according to the above-described (1), where the phenolic thermosetting resin is the straight novolak phenolic resin.

The friction material according to the above-described (1) or (2), contains the unvulcanized nitrile rubber (NBR) particle as the part or the entire part of the rubber particle.

Advantage of the Invention

According to this invention, in the friction material used for the brake shoe of the drum brake utilizing for the passenger car, the friction material that continuously reduces the occurrence of the low frequency noise and provides excellent braking effectiveness and wear resistance.

EMBODIMENTS OF THE INVENTION

In this invention, a phenolic resin using as a binder can be resins normally used in a friction material such as a straight novolak phenolic resin, a modified resin obtained by modifying a phenolic resin with various types of elastomers such as a nitrile rubber or an acrylic rubber or various types of oils such as cashew oil or silicone oil, an aralkyl modified phenolic resin obtained by reacting a phenolic compound, an aralkyl ether compound, and an aldehyde compound, and a thermosetting resin obtained by dispersing such as various elastomers or a fluorine-containing polymer. In this invention, one type of the above-resin alone or any combination of two or more types of the above-resins may be used.

Among those resins, it is preferable to use the straight novolak phenolic resin alone, which effectively inhibits the low frequency noise.

The effective inhibition of the low frequency noise may be achieved because elasticity of the cured straight novolak phenolic resin is less than the elasticity of the cured resin obtained by curing an elastomer modified phenolic resin or an elastomer dispersed phenolic resin and it is estimated that the stick slip of the friction material against the mating member, while the drum brake is acted, is less likely to occur.

The cashew dust as the organic friction modifier can be obtained by curing cashew nuts shell liquid or cashew nuts shell polymer by the aldehyde compound such as furfural and formaldehyde to crush the same or can be obtained by curing cashew nuts shell liquid or cashew nuts shell polymer by a curing agent such as hexamethylenetetramine to crush the same. Here, one type of the above-crushed cashew dust alone or any combination of two or more types of the above-crushed cashew dusts may be used. The amount of the cashew dust contained therein is 9-18 weight % relative to the total amount of the friction material composition.

In addition, the rubber particle as the organic friction modifier can be a vulcanized rubber powder or an unvulcanized rubber powder such as a pulverized powder of a tire tread rubber, a nitrile rubber, a styrene-butadiene rubber, a butyl rubber, an acrylic rubber, and a silicone rubber.

Among the above-mentioned rubber particles, it is preferable to use the unvulcanized nitrile rubber powder because the effectiveness of inhibiting the low frequency noise can be improved by adding the unvulcanized nitrile rubber partially or as the entire rubber powder.

The amount of the rubber particles is 6-12 weight % relative to the total amount of the friction material composition, and the total amount of the cashew dust and the rubber particles is 18-25 weight % relative to the total amount of the friction material composition.

Aluminum particles are used as a part of the inorganic friction modifier. By adding the aluminum particles, an aluminum film/layer is formed on a friction surface of the brake drum, and the occurrence of the stick slip that is a cause of the low frequency noise can be inhibited.

It is preferable to use the aluminum particles which is manufactured by an atomizing method and has an average particle diameter of 50-300 μm.

In this invention, the average particle diameter means 50% particle diameter by the laser diffraction particle size distribution method.

The friction material of this invention is made from the friction material composition further contains materials that are normally used in the friction material such as the fiber base (organic fiber), the inorganic friction modifier, the pH adjuster, and the inorganic filler in addition to the above-described phenolic thermosetting resin, the cashew dust, the rubber particles, and the aluminum particles.

As the fiber base, organic fibers, that are normally used in the friction material, such as an aramid fiber, a cellulose fiber, and a polyacrylonitrile fiber may be used. The amount of the organic fiber contained in the friction material is preferably 5-10 weight % relative to the total amount of the friction material composition in order to secure the strength of the friction material.

Other than the above-described aluminum particles, as the inorganic friction modifier, a particle type inorganic friction modifier such as a zirconium oxide, a magnesium oxide, a zirconium silicate, a silicon oxide, an a alumina, a y alumina, and a triiron tetroxide, a fiber type inorganic friction modifier such as a wollastonite, a sepiolite, a basalt fiber, a glass fiber, a biosoluble artificial mineral fiber, and a rock wool, and a metal particle or an alloy particle such as a copper particle, a brass particle, a bronze particle, and a zinc particle may be used. In this invention, one type of the above-inorganic friction modifier alone or any combination of two or more types of the above-inorganic friction modifier may be used.

Discharging the friction powder of the copper component such as the copper particle, the brass particle, and the bronze particle gives an adverse effect on the environment, and therefore it is not preferable to add the copper component in the friction material component.

The amount of the inorganic friction modifier together with the above-described aluminum particle is preferably 7-15 weight % relative to the total amount of the friction material composition.

The pH adjuster such as a calcium hydroxide that is normally used in the friction material may be used. The amount of the pH adjuster contained in the friction material is preferably 3-15 weight % relative to the total amount of the friction material composition.

An inorganic filler may be used as the remaining components other than the binder, the organic fiber, the organic friction modifier, the inorganic friction modifier, and the pH adjuster. As the inorganic filler, inorganic particles such as a heavy calcium carbonate, a barium sulfate, a kaolin, and a kibushi clay, which show small grindability against a cast iron that is a main material of the brake drum. In this invention, one type of the above-inorganic filler alone or any combination of two or more types of the above-inorganic filler may be used.

The friction material in this invention used for the brake shoe of the drum brake utilizing for the passenger car is manufactured through a mixing step for uniformly mixing the predetermined amount of the friction material composition by a mixer, a heat press forming step for heat press forming the obtained raw friction material mixture after filling the same in a heat forming die, a heat treatment step for heating the obtained formed product to complete reactive curing of the binder, and a grinding step for forming a friction surface.

If necessary, prior to the heat press forming step, a granulating step for granulating the raw friction material composition, a kneading step for kneading the raw friction material composition, and a preforming step for forming a preformed product after filling the raw friction material composition or the granulated friction material composition obtained through the granulation step and the kneaded friction material composition obtained through the kneading step in a preforming die.

EMBODIMENTS

This invention is concretely explained using the embodiments and comparative examples are shown in the following sections, but this invention is not limited to the following embodiments.

Manufacturing Method for the Friction Material in the Embodiments 1-13 and Comparative Examples 1-13

The friction material composition of the components shown in the TABLE 1 and TABLE 2 is mixed by a Loedige mixer for about 5 minutes and is press for 20 seconds under 10 MPa in the preforming metal die. After forming the obtained preformed product for 6 minutes at 150 centigrade of the forming temperature under 40 MPa of the forming pressure, the heat treatment (post curing) at 180 centigrade is conducted on the obtained formed product for 5 hours, and a friction surface is formed by grinding the post cured article to produce a brake lining (Embodiments 1-13 and comparative examples 1-13).

TABLE 1

| | | Embodiments | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Binder | Straight phenolic resin | 10 | 5 | 10 | 8 | 12 | 10 | 10 | 10 | 10 | 10 | 10 | 10 | 10 |
| | NBR modified phenolic resin | 0 | 5 | 0 | 0 | 0 | 0 | 0 | 0 | 0 | 0 | 0 | 0 | 0 |
| Organic fiber | Aramid fiber | 6 | 6 | 6 | 6 | 6 | 6 | 6 | 6 | 6 | 6 | 6 | 6 | 6 |
| | Cellulose fiber | 2 | 2 | 2 | 2 | 2 | 2 | 2 | 2 | 2 | 2 | 2 | 2 | 2 |
| Lubricant | Squamous graphite | 0 | 0 | 0 | 0 | 0 | 0 | 0 | 0 | 0 | 0 | 0 | 0 | 0 |
| Organic friction modifier | Cashew dust | 12 | 12 | 12 | 12 | 12 | 11 | 16 | 12 | 12 | 9 | 18 | 13 | 12 |
| | Nitrile rubber (NBR) particle | 8 | 8 | 4 | 8 | 8 | 7 | 9 | 8 | 8 | 10 | 6 | 6 | 12 |
| | Tire tread rubber pulverized powder | 0 | 0 | 4 | 0 | 0 | 0 | 0 | 0 | 0 | 0 | 0 | 0 | 0 |

TABLE 1-continued

|  |  | Embodiments | | | | | | | | | | | | |
| --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 11 | 12 | 13 |
| Inorganic friction modifier | Aluminum particle | 7 | 7 | 7 | 7 | 7 | 7 | 7 | 4 | 10 | 7 | 7 | 7 | 7 |
|  | Silicon oxide particle | 2 | 2 | 2 | 2 | 2 | 2 | 2 | 2 | 2 | 2 | 2 | 2 | 2 |
|  | Triiron tetroxide particle | 2 | 2 | 2 | 2 | 2 | 2 | 2 | 2 | 2 | 2 | 2 | 2 | 2 |
|  | Mica | 0 | 0 | 0 | 0 | 0 | 0 | 0 | 0 | 0 | 0 | 0 | 0 | 0 |
|  | Vermiculite | 0 | 0 | 0 | 0 | 0 | 0 | 0 | 0 | 0 | 0 | 0 | 0 | 0 |
| pH adjuster | Calcium hydroxide particle | 10 | 10 | 10 | 10 | 10 | 10 | 10 | 10 | 10 | 10 | 10 | 10 | 10 |
| Inorganic filler | Heavy calcium carbonate particle | 41 | 41 | 41 | 43 | 39 | 43 | 36 | 44 | 38 | 42 | 37 | 42 | 37 |
|  | Total | 100 | 100 | 100 | 100 | 100 | 100 | 100 | 100 | 100 | 100 | 100 | 100 | 100 |

TABLE 2

|  |  | Comparative Examples | | | | | | | | | | | | |
| --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 11 | 12 | 13 |
| Binder | Straight phenolic resin | 7 | 13 | 10 | 10 | 10 | 10 | 10 | 10 | 10 | 10 | 10 | 10 | 10 |
|  | NBR modified phenolic resin | 0 | 0 | 0 | 0 | 0 | 0 | 0 | 0 | 0 | 0 | 0 | 0 | 0 |
| Organic fiber | Aramid fiber | 6 | 6 | 6 | 6 | 6 | 6 | 6 | 6 | 6 | 6 | 6 | 6 | 6 |
|  | Cellulose fiber | 2 | 2 | 2 | 2 | 2 | 2 | 2 | 2 | 2 | 2 | 2 | 2 | 2 |
| Lubricant | Squamous graphite | 0 | 0 | 0 | 0 | 0 | 0 | 3 | 0 | 0 | 0 | 0 | 0 | 0 |
| Organic friction modifier | Cashew dust | 12 | 12 | 10 | 17 | 12 | 12 | 12 | 12 | 12 | 8 | 19 | 13 | 12 |
|  | Nitrile rubber (NBR) particle | 8 | 8 | 7 | 9 | 8 | 8 | 8 | 8 | 8 | 10 | 6 | 5 | 13 |
|  | Tire tread rubber pulverized powder | 0 | 0 | 0 | 0 | 0 | 0 | 0 | 0 | 0 | 0 | 0 | 0 | 0 |
| Inorganic friction modifier | Aluminum particle | 7 | 7 | 7 | 7 | 3 | 11 | 7 | 7 | 7 | 7 | 7 | 7 | 7 |
|  | Silicon oxide particle | 2 | 2 | 2 | 2 | 2 | 2 | 2 | 2 | 2 | 2 | 2 | 2 | 2 |
|  | Triiron tetroxide particle | 2 | 2 | 2 | 2 | 2 | 2 | 2 | 2 | 2 | 2 | 2 | 2 | 2 |
|  | Mica | 0 | 0 | 0 | 0 | 0 | 0 | 0 | 3 | 0 | 0 | 0 | 0 | 0 |
|  | Vermiculite | 0 | 0 | 0 | 0 | 0 | 0 | 0 | 0 | 3 | 0 | 0 | 0 | 0 |
| pH adjuster | Calcium hydroxide particle | 10 | 10 | 10 | 10 | 10 | 10 | 10 | 10 | 10 | 10 | 10 | 10 | 10 |
| Inorganic filler | Heavy calcium carbonate particle | 44 | 38 | 44 | 35 | 45 | 37 | 38 | 38 | 38 | 43 | 36 | 43 | 36 |
|  | Total | 100 | 100 | 100 | 100 | 100 | 100 | 100 | 100 | 100 | 100 | 100 | 100 | 100 |

The low frequency noise, the braking effectiveness, and the wear resistance of the brake linings according to the Embodiments 1-13 and the Comparative Examples 1-13 are evaluated. The evaluation standard is shown in TABLE 3, and the evaluation results are shown in TABLE 4 and TABLE 5.

TABLE 3

| Evaluation Items | | | |
| --- | --- | --- | --- |
| Low Frequency Noise 1 | Low Frequency Noise ② (After Evaluating Low Frequency Noise ①) | Braking Effectiveness | Wear Resistance |
| | Evaluation Method | | |
| Burnish Based on JASO(Japanese Automobile Standard Organization) C406-00 (Passenger Car-Braking Device- | First Fade Recovery Test Based on JASO C402-99 (Passenger Cars-Service Brake Road Test Procedures) | Based on JASO C406-00 (Passenger Car-Braking Device-Dynamometer Test Procedures) Initial Braking | Based on JASO C427 (Brake Lining And Disc Brake Pad-Wear Test Procedure On Inertia Dynamometer) Initial-Brake |

TABLE 3-continued

| Dynamometer Test Procedures) Initial Braking Speed: 60 km/h Braking Deceleration: 3.5 m/s2 Initial-Brake Temperature: 60 centigrade Repetitions: 200 | Initial Braking Speed: 100 km/h Braking Deceleration: 4.5 m/s2 Repetitions: 10 | Speed: 100 km/h | Temperature: 200 centigrade |
|---|---|---|---|
| Low Frequency Noise Evaluation Testing Based on JASO C402-99 (Passenger Cars-Service Brake Road Test Procedures) Initial Braking Speed: 20 km/h Initial-Brake Temperature: 50 centigrade Braking Deceleration; 1.96 m/s2 Repetitions: 10 | | | |
| Number of Occurrence of Low Frequency Noise | | Average of the Second Effectiveness Testing | Amount of Wear of Fricion Material at 1000 times applications |
| Evaluation Standard | | | |
| ◎ | 0 | 0.31 or more | Less than 0.10 mm |
| ○ | 1-4 | 0.28 or more less than 0.31 | 0.10 mm or more less than 0.15 mm |
| Δ | 5-7 | 0.25 or more less than 0.28 | 0.15 mm or more less than 0.20 mm |
| X | 8-10 | Less than 0.25 | 0.20 mm or more |

TABLE 4

| | | Embodiments | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Evaluation Result | Low Frequency Noise ① | ◎ | ○ | ○ | ○ | Δ | ○ | Δ | ○ | ○ | ○ | Δ | ○ | Δ |
| | Low Frequency Noise ② | ◎ | ○ | ○ | ○ | Δ | ○ | Δ | ○ | ○ | ○ | Δ | ○ | Δ |
| | Braking Effectiveness | ◎ | ◎ | ◎ | ○ | ○ | Δ | ○ | Δ | ○ | Δ | ○ | Δ | Δ |
| | Wear Resistance | ◎ | ◎ | ◎ | Δ | ◎ | ◎ | ○ | ◎ | Δ | ◎ | ○ | ◎ | ○ |

TABLE 5

| | | Comparative Examples | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Evaluation Result | Low Frequency Noise ① | ○ | x | ○ | x | Δ | ○ | ◎ | ◎ | ◎ | ○ | x | ○ | x |
| | Low Frequency Noise ② | ○ | x | ○ | x | Δ | ○ | x | x | x | Δ | x | ○ | x |
| | Braking Effectiveness | ○ | ○ | x | Δ | x | ○ | ○ | ◎ | ◎ | x | Δ | x | x |
| | Wear Resistance | x | ◎ | ◎ | Δ | ◎ | x | ◎ | ◎ | ◎ | ◎ | x | ◎ | Δ |

INDUSTRIAL APPLICABILITY

According to this invention, in the friction material used for the brake shoe of the drum brake utilizing for the passenger car, the friction material in this invention provides a great practical value as it can reduce occurrence of the low frequency noise continuously and provide the excellent braking effectiveness and wear resistance.

The invention claimed is:

1. A friction material used for a brake shoe of a drum brake for a passenger car, which is manufactured by forming a friction material composition containing a binder, an organic fiber, an inorganic friction modifier, an organic friction modifier, a pH adjuster, and an inorganic filler, wherein
    said friction material composition does not comprise graphite, mica, or vermiculite but comprises 8-12 weight %, relative to the total amount of the friction material composition, of a phenolic thermosetting resin as the binder, 9-18 weight %, relative to the total amount of the friction material composition, of cashew dust and 6-12 weight %, relative to the total amount of the friction material composition, of a rubber particle as the organic friction modifier, where the total amount of the cashew dust and rubber particle is 18-25 weight % relative to the total amount of the friction material composition, and 4-10 weight %, relative to the total amount of the friction material composition, of metallic aluminum particle with an average particle diameter of 50-300 μm as the inorganic friction modifier.

2. The friction material according to claim 1, wherein
    the phenolic thermosetting resin consists of a straight novolak phenolic resin.

3. The friction material according to claim 1, wherein
    said friction material composition contains an unvulcanized nitrile rubber (NBR) particle as a part of the rubber particle or an entire part of the rubber particle.

4. The friction material according to claim 2, wherein said friction material composition contains an unvulcanized nitrile rubber (NBR) particle as a part of the rubber particle or an entire part of the rubber particle.

* * * * *